Oct. 16, 1951 A. L. SEMON 2,571,770
DEVICE FOR LUBRICATING FLUID PRESSURE OPERATED MEANS
Filed July 5, 1947
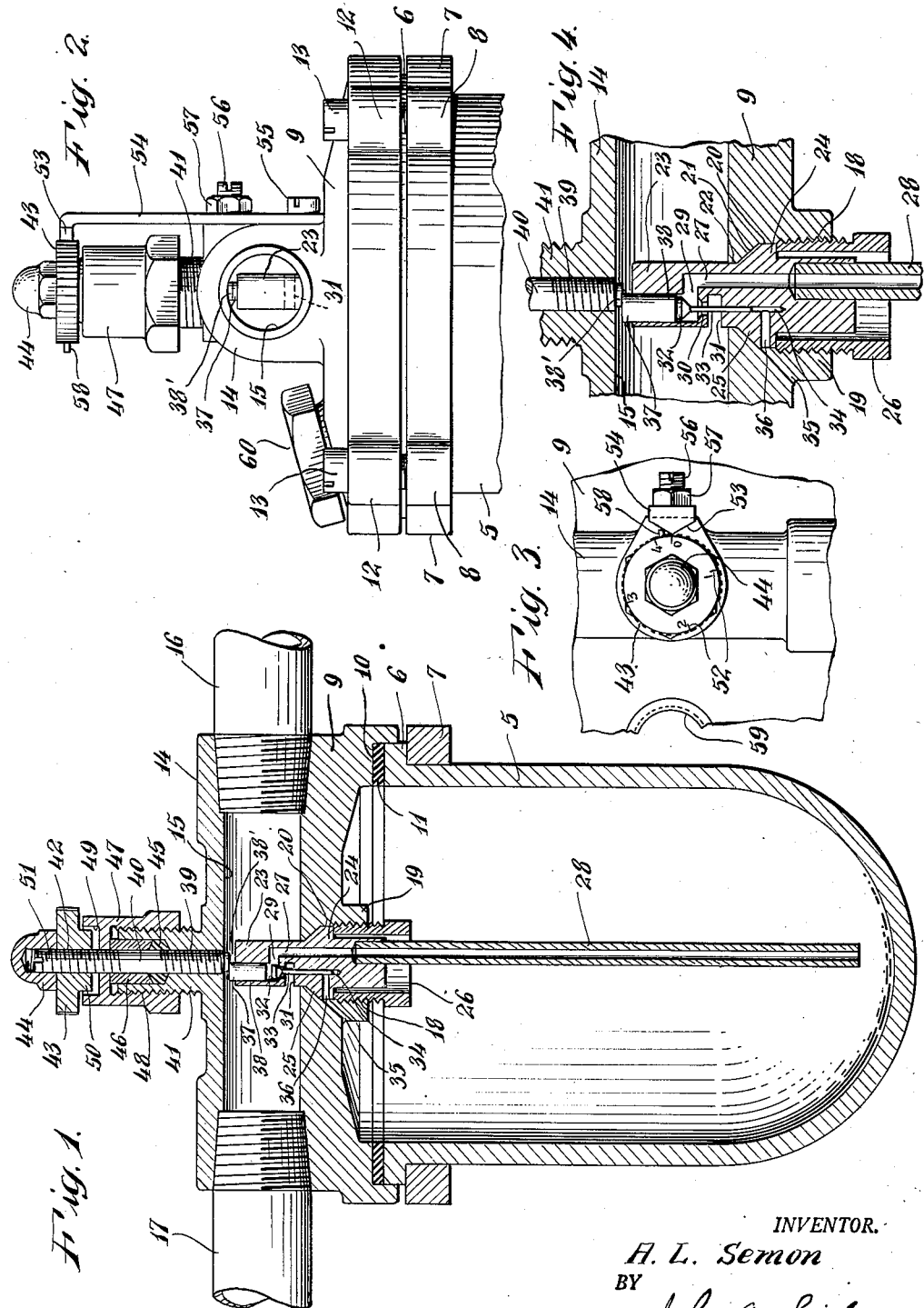
INVENTOR.
A. L. Semon
BY
John A. Seifert
ATTORNEY.

Patented Oct. 16, 1951

2,571,770

UNITED STATES PATENT OFFICE 2,571,770

DEVICE FOR LUBRICATING FLUID PRESSURE OPERATED MEANS

Albert L. Semon, Short Hills, N. J.

Application July 5, 1947, Serial No. 759,041

9 Claims. (Cl. 184—55)

This invention relates to devices for lubricating fluid pressure operated means, such as pneumatic tools, by delivering a spray of lubricant into a conduit connecting a source of supply of fluid pressure in communication with the fluid pressure operated means.

It is an object of the invention to control the delivery of a spray of lubricant into the conduit from a lubricant outlet of a lubricant containing receptacle and prevent an undue amount of lubricant to be delivered to the fluid pressure operated means.

It is another object of the invention to provide means in the lubricant outlet of the lubricant containing receptacle to shut off the delivery of lubricant from the receptacle into the conduit while maintaining communication between the fluid pressure in the receptacle and the conduit to permit the escape of excess fluid pressure in the receptacle when the conduit is shut off from communication with either the source of supply of fluid pressure or the fluid pressure operated means and prevent the delivery of an excessive amount of lubricant to the conduit when the communication between the conduit and the source of supply of fluid pressure and the fluid pressure operated means is opened.

It is a further object of the invention to provide perfect control of the delivery of lubricant to the conduit whereby the delivery is uniformly increased or decreased.

Another object of the invention is to provide such a device which does not form a restriction in the conduit.

In the drawing accompanying and forming a part of this application,

Figure 1 is an elevational view in section of the device showing the delivery of lubricant shut off from the conduit when either the source of supply of fluid pressure or the fluid pressure operated means is shut off from said conduit.

Figure 2 is a fragmentary view in elevation of the upper portion of the lubricant containing receptacle looking at the right hand side of Figure 1.

Figure 3 is a fragmentary view looking at the top of Figure 2 to show a calibrated knob for adjusting abutment means to vary the movement of valve means to control the amount of delivery of lubricant from the lubricant containing receptacle.

Figure 4 is a fragmentary sectional view, on an enlarged scale, to show the valve means actuated to permit the delivery of lubricant from the lubricant containing receptacle to the conduit when said conduit is in open communication with the source of supply of fluid pressure and the fluid pressure operated means.

The embodiment of the invention illustrated in the accompanying drawing comprises a cup shaped receptacle 5 of suitable opaque or transparent material, such as metal, glass or plastic, for containing a supply of lubricant, such as oil. The upper open end of the receptacle is arranged with an outwardly extending flange 6 for the engagement of an annular member or ring 7 having equidistantly spaced projections 8 extended from the periphery thereof.

A head 9 hermetically closes the flanged open end of the receptacle 5 by being provided with an annular seat 10 corresponding to said flanged end of the receptacle to engage the end and side edges of the flanged end of the receptacle with a gasket 11 interposed between the seat and end edge, as shown in Figure 1. The head 9 is also arranged with equidistantly spaced projections 12 corresponding to the projections 8 of the ring 7. The head is releasably retained in hermetical closing position on the receptacle 5 by screws 13 extended through the projections 12 and screw threaded in the projections 8 to clamp the gasket 11 to the end edge of the flange 6 of the receptacle and the ring 7 to the underface of the flange 6.

A tubular boss 14 is arranged on top of and integral with the head 9 and extended transversely of the center thereof. The bore of the boss is of uniform diameter to form a passage 15 with opposite end portions of the passage enlarged and screw threaded for the engagement of the screw threaded ends of a conduit or pipe 16 connected in communication with a source of supply of fluid pressure, such as an air compressor, not shown, and a conduit or pipe 17 connected in communication with a fluid pressure operated means, such as a pneumatic tool, not shown.

The fluid pressure or compressed air flows through the passage 15 from the pipe 16 to the pipe 17, and said flow of fluid pressure or compressed air forces a small quantity of oil from the receptacle 5 into the passage 15 and pipe 17. This is accomplished by providing an opening in the head 9 communicating with the receptacle 5 and passage 15 and having a screw threaded portion 18 at one end thereof arranged in a boss 19 projecting from the bottom face of the head. Said opening is also arranged with a smooth straight vertical wall portion 20 between the screw threaded portion 18 and a smooth tapered wall portion 21 extending from the vertical wall portion 20 to a smooth vertical wall portion 22 of less diameter than the diameter of the straight wall portion 20 and adjacent to the passage 15, as shown in Figures 1 and 4.

An oil delivery nozzle member is mounted in the opening 18, 20, 21, 22 and comprises a body 23 having an annular shoulder intermediate the ends thereof including a vertical wall portion 24 to engage the vertical wall portion 20 of the opening and a tapered portion 25 to engage the tapered portion 21 of the opening. The end portion of the body 23 of the nozzle member adjacent to the tapered wall shoulder portion 25 extends through the straight wall portion 22 of the opening and into the passage 15. The opposite end portion of the body 23 of the nozzle member adjacent to the straight wall shoulder portion 24 extends through the screw threaded portion 18 in spaced relation to the screw threads and beyond the boss 19. The nozzle body 23 is retained in the opening 18, 20, 21, 22 by a tubular plug 26 screw threaded into the screw threaded opening portion 18 to engage the underface of the shoulder portion 24 and abut the shoulder portion 25 against the opening portion 21. The end portion of the nozzle body 23 adjacent to the shoulder portion 24 is spaced from the inner wall face of the plug 26 to permit clamping of the nozzle body 23 in the head 9 without disturbing the desired position of the nozzle body.

The nozzle body 23 is arranged with an oil delivery passage 27 extending at one side and parallelly of the longitudinal axis of the body 23 and having an enlarged end portion opening to the end of the body within the plug 26 for the mounting of a tube 28 therein. The tube 28 is secured in the enlarged end portion of the passage 27, such as by sweating, and extended from the body 23 to adjacent the bottom of the receptacle 5, as shown in Figure 1. The bore of the tube corresponds to the diameter of the passage 27. The opposite end of the passage 27 communicates with a transverse passage 29 in the end portion of the nozzle body 23 extended into the passage 15. The diameters of the passages 27 and 29 are substantially the same. The transverse passage 29 has an outlet port 30 extending in parallel spaced relation to the passage 27 and from the transverse passage 29 to a transverse recess 31 in the side of the nozzle body 23, said recess 31 extending in parallel spaced relation to and below the passage 29 and constituting the delivery orifice.

The delivery of oil from the receptacle 5 to the delivery orifice 31 through the tube 28, passages 27, 29 and port 30 is controlled by a valve comprising a head 32 having a tapered face to engage a corresponding tapered seat in the inner end of the port 30 and close said port when fully engaged and a stem 33 extending through the port 30 and transversely of the recess 31 into a bore 34 extending parallelly of the passage 27 and on the opposite side of the longitudinal axis of the body 23 and terminating within said body. There is a slight clearance between the stem 33 and the bore 34 to permit passage of fluid pressure or air between the receptacle 5 and passage 15 through a passage 35 in the head 9 opening to the receptacle adjacent to the boss 19 and communicating with a passage 36 in the body 23 communicating with the bore 34. The diameters of the bore 34 and passages 35 and 36 are substantially the same.

The valve 32, 33 is actuated to the open position shown in Figure 4 when the passage 15 is in open communication with the source of supply of fluid pressure through the pipe 16 and with the fluid pressure operated means through the pipe 17. The open position of the valve 32, 33 relative to the port 30 is varied by a plunger 37 slidable in a bore 38 in the end portion of the nozzle body 23 extended into the passage 15. The bore 38 is in vertical alinement with the port 30 and permits movement of the valve head 32 in a direction from the port 30 to open said port, as shown in Figure 4. The movement of the plunger 37 in an upward direction is adjustably limited by an abutment member having a reduced end portion 38' to engage the plunger 37 and a screw threaded portion 39 adjacent to said reduced end portion adjustably mounted in the boss 14. A smooth intermediate portion 40 of the abutment member passes through a stuffing box 41 integral with and extended vertically from the boss 14. The opposite end of the abutment member is screw threaded, as at 42, for the mounting of a knob 43 thereon and said knob 43 is retained on the screw threaded end portion 42 of the abutment member by a cap 44 screw threaded on a section of the screw threaded end portion 42 projecting from the knob. A packing 45 is retained in the stuffing box 41 by a sleeve 46 slidably engaged on the smooth portion 40 of the abutment member and pressed against the packing 45 by a cap member 47 screw threaded on the stuffing box, as shown at 48 in Figure 1. The closed end of the cap member 47 has a recess 49 therein for slidably engaging a depending portion 50 of the knob 43. To adjust the abutment member in the boss 14, the screw threaded end 42 is slotted, as at 51 for the engagement of a suitable tool, such as a screw driver. After the abutment member has been adjusted to properly position said member in the boss 14, the knob 43 is secured to the abutment member by the cap 44 and the reduced end portion 38' of the abutment member may be minutely adjusted manually toward and away from the nozzle body 23 by the knob 43 for which purpose the periphery of said knob is serrated and indicia are arranged on the upper face of the knob, as indicated at 52 in Figure 3. The indicia are positioned by the rotation of the knob relative to a pointer 53 arranged on one end of a resilient arm 54 fixed at the opposite end on the boss 14 by a screw 55 with an intermediate portion of the arm slidable on a post 56 extended from the boss 14 and said intermediate portion of the arm being adapted to be clamped to the boss 14 by a nut 57 screw threaded on the post. The pointer 53 is yieldingly urged by the resiliency of the arm 54 to engage the notches or serrations on the periphery of the knob 43 and retain the knob in adjusted position. The indicia 52 on the knob indicate the position of the reduced end portion 38' of the abutment member relative to the plunger 37. When it is desired to adjust the knob without the restraining action of the pointer 53, the arm 54 is released from the boss by unscrewing the nut 57. To limit the adjustment of the knob from "0" position to "4" position, the knob is provided with an abutment in the form of a pin 58 fixed in and extended from the periphery of the knob at a point midway between the "0" and "4" indicia to engage the opposite sides of the pointer 53 depending on the direction of rotation of the knob. The distance between the reduced end portion 38' and the upper end of the plunger 37 in its lowermost position will determine the upward movement of the plunger and the open position of the valve 32, 33.

The valve 32, 33 is actuated to open position by the flow of fluid pressure in the passage 15. The positioning of the valve head 32 out of engagement with the valve seat in the port 30 permits the flow of oil from the passage 27 through the port 30 and delivery orifice 31 into the passage 15. The oil is forced up the tube 28 and passage 27 by a differential in pressure in the receptacle 5 and passage 15.

When the passage 15 is shut off from either the source of supply of fluid pressure through the pipe 16 or the fluid pressure operated means through the pipe 17, the valve 32, 33 assumes its port closing position due to the lack of sufficient pressure in the passage 15. The closing of the port 30 by the valve head 32 prevents the flow of oil into the passage 15. Any excess fluid pressure in the receptacle 5 tending to force the oil up the tube 28 and passage 27 will escape through the passages 35, 36 and the clearance between the bore 34 and valve stem 33 to the delivery orifice 31 and thence to the passage 15.

Due to the escape of excessive fluid pressure from the receptacle 5, there will be no excessive amount of oil delivered to the passage 15 when said passage is again opened in communication with both the source of supply of fluid pressure through the pipe 16 and the fluid pressure operated means through the pipe 17.

The supply of lubricant or oil in the receptacle 5 is replenished through a filler opening 59, Figure 3, in the head 9 closed by a closure cap, as shown at 60 in Figure 2.

Having thus described my invention, I claim:

1. In a lubricating device for fluid pressure operated means, a head having a passage adapted to be connected at the opposite ends in a conduit connecting a source of supply of fluid pressure in communication with fluid pressure operated means, a lubricant containing receptacle mounted on the head and having an air space above the lubricant therein, a nozzle extending into the passage of the head and having a lubricant delivery orifice connected in communication with the lubricant and the air space in the receptacle, and a valve mounted in the nozzle and operative to shut-off the communication between the lubricant delivery orifice and the lubricant in the receptacle while maintaining the communication between the lubricant delivery orifice and the air space in the receptacle when the communication between the source of supply of fluid pressure and the fluid pressure operated means is interrupted and the valve actuated to position to open communication between the lubricant delivery orifice and the lubricant in the receptacle by the fluid pressure in the passage of the head when the communication between the source of supply of fluid pressure and the fluid pressure operated means is open.

2. In a lubricating device for fluid pressure operated means as claimed in claim 1, means adjustable exteriorly of the head to vary the opening position of the valve in the nozzle and the quantity of lubricant discharged from the delivery orifice.

3. A lubricating device for fluid pressure operated means as claimed in claim 2, wherein the adjustable means comprises a plunger slidable in the nozzle and abutting the valve, a member adjustably mounted in the head with one end portion extending into the passage of the head to abut and limit the movement of the plunger in a direction from the valve and the opposite end portion of said abutment member extending exteriorly of the head, a serrated knob carried by the exterior end portion of the adjustable abutment member to actuate the adjustable abutment member, a resilient arm fixed at one end to the head and having a pointer at the opposite end to engage the serrations of the knob under the force of the resilient arm and adapted to be disengaged from the serrations by flexing the arm, and means adjustably supported by the head to clamp an intermediate portion of the resilient arm against flexing movement and prevent disengagement of the pointer from the serrations of the knob.

4. In a lubricating device for fluid pressure operated means, a head having a passage adapted to be connected at the opposite ends in a conduit connecting a source of supply of fluid pressure in communication with fluid pressure operated means, a lubricant containing receptacle mounted on the head and having an air space above the lubricant therein, a nozzle mounted in the head to extend into the passage of the head and arranged with a lubricant delivery orifice having separate communications with the lubricant and the air space in the receptacle, and a valve operatively mounted in the nozzle to control the communication between the delivery orifice and the lubricant in the receptacle while maintaining the communication between the orifice and the air space in the receptacle.

5. A lubricating device for fluid pressure operated means as claimed in claim 4, wherein the communication between the lubricant delivery orifice and the lubricant in the receptacle consists of a passage in the nozzle communicating with said orifice and a tube having one end mounted in the nozzle and communicating with the passage and the opposite end terminating below the level of the lubricant in the receptacle.

6. A lubricating device for fluid pressure operated means as claimed in claim 4, wherein the communication between the lubricant delivery orifice and the air space in the receptacle consists of a passage in the nozzle communicating with said orifice and a passage in the head communicating at one end with the passage in the nozzle and at the opposite end with the air space in the receptacle.

7. In a lubricating device for fluid pressure operated means, a head having a passage adapted to be connected at the opposite ends in a conduit connecting a source of supply of fluid pressure in communication with fluid pressure operated means, a lubricant containing receptacle mounted on the head, a nozzle mounted in the head with one end portion extending into the passage of the head and arranged with a recess extending into the side of the end portion of the nozzle extended into the passage of the head and constituting a lubricant delivery orifice, a port in one side of the recess, a passage extending longitudinally of the nozzle with one end communicating with the port and the opposite end opening to the end of the nozzle opposite the end portion extended into the passage of the head, a bore in the nozzle extending parallelly of the passage in the nozzle and in alinement with the port with one end communicating with the recess, a second passage in the nozzle communicating at one end with the bore and the opposite end communicating with the receptacle, a tube mounted at one end in the first passage of the nozzle and having the opposite end submerged in the lubricant in the receptacle, and a valve having a stem of less diameter than the diameter of the bore and slidable in said bore and a head to engage the port and control the delivery of lubricant to the recess through the tube, first passage in the nozzle and the port by the sliding movement of the valve stem.

8. A lubricating device for fluid pressure operated means as claimed in claim 7, wherein the nozzle is arranged with a second bore in alinement with the port to receive the valve head in the open position of the valve, a plunger slidable in the second bore to abut the valve head, and means adjustably mounted in the head to engage the plunger and limit the opening movement of the valve.

9. A lubricating device for fluid pressure operated means as claimed in claim 7, wherein the nozzle is provided with an annular shoulder and is removably mounted in an opening in the head by a tubular plug screw threaded in the opening of the head and abutting the shoulder of the nozzle.

ALBERT L. SEMON.

REFERENCES CITED

The following references are of record in the file of this patent:

UNITED STATES PATENTS

| Number | Name | Date |
|---|---|---|
| 1,696,485 | Ihrmark | Dec. 25, 1928 |
| 1,755,240 | Clark | Apr. 22, 1930 |
| 2,223,700 | Norgren | Dec. 3, 1940 |
| 2,430,361 | O'Farrell | Nov. 4, 1947 |